United States Patent
Hyun

(10) Patent No.: US 9,664,843 B2
(45) Date of Patent: May 30, 2017

(54) DISPLAY DEVICE

(71) Applicant: LG Innotek Co., Ltd., Seoul (KR)

(72) Inventor: Soon Young Hyun, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/372,862

(22) Filed: Dec. 8, 2016

(65) Prior Publication Data

US 2017/0090110 A1    Mar. 30, 2017

Related U.S. Application Data

(63) Continuation of application No. 14/233,861, filed as application No. PCT/KR2012/005123 on Jun. 28, 2012.

(30) Foreign Application Priority Data

Jul. 18, 2011 (KR) .................. 10-2011-0071134

(51) Int. Cl.
  *F21V 9/16* (2006.01)
  *F21V 8/00* (2006.01)
  *G02F 1/1333* (2006.01)
  *G02F 1/1335* (2006.01)

(52) U.S. Cl.
  CPC ......... *G02B 6/0085* (2013.01); *G02B 6/0023* (2013.01); *G02F 1/1336* (2013.01); *G02F 1/133308* (2013.01); *G02F 2001/133314* (2013.01); *G02F 2001/133614* (2013.01); *G02F 2001/133628* (2013.01)

(58) Field of Classification Search
  CPC . F21V 3/005; F21V 5/001; F21K 9/56; G02F 1/133617; G02B 6/0023; G02B 6/0026; G02B 6/0073; G02B 6/0085
  USPC .......................................... 362/84, 218, 294
  See application file for complete search history.

(56) References Cited

U.S. PATENT DOCUMENTS

| | | |
|---|---|---|
| 5,162,696 A | 11/1992 | Goodrich |
| 2007/0086184 A1 | 4/2007 | Pugh et al. |
| 2009/0009689 A1 | 1/2009 | Okuwaki et al. |
| 2009/0040423 A1 | 2/2009 | Bae et al. |
| 2009/0296367 A1 | 12/2009 | Sekine et al. |
| 2009/0316064 A1 | 12/2009 | Kono et al. |
| 2010/0133556 A1 | 6/2010 | Li et al. |

(Continued)

FOREIGN PATENT DOCUMENTS

| | | |
|---|---|---|
| JP | 2005353650 A | 12/2005 |
| JP | 2007149665 A | 6/2007 |

(Continued)

OTHER PUBLICATIONS

International Search Report in International Application No. PCT/KR2012/005123, filed Jun. 28, 2012.

(Continued)

*Primary Examiner* — Sean Gramling
(74) *Attorney, Agent, or Firm* — Saliwanchik, Lloyd & Eisenschenk

(57) ABSTRACT

Disclosed is a display device. The display device includes a light source; a wavelength conversion member converting a wavelength of light output from the light source; a display panel to which the light is incident; a heat transfer part adjacent to the light source and the wavelength conversion member; and a heat dissipation part connected to the heat transfer part.

20 Claims, 6 Drawing Sheets

(56) References Cited

U.S. PATENT DOCUMENTS

| | | |
|---|---|---|
| 2011/0037926 A1 | 2/2011 | Tsukahara et al. |
| 2011/0170034 A1 | 7/2011 | Jeong |
| 2013/0100635 A1 | 4/2013 | Xu et al. |

FOREIGN PATENT DOCUMENTS

| | | |
|---|---|---|
| JP | 2009038006 A | 2/2009 |
| JP | 2010009845 A | 1/2010 |
| KR | 10-2011-0012246 A | 2/2011 |

OTHER PUBLICATIONS

European Search Report in European Application No. 12815557, filed Nov. 25, 2014.
Database WPI, Week 201136, Thomson Scientific, London, GB; AN 2011-B77413, XP-002732453.
Office Action dated Nov. 17, 2015 in U.S. Appl. No. 14/233,861.
Office Action dated May 31, 2016 in U.S. Appl. No. 14/233,861.

DISPLAY DEVICE

CROSS-REFERENCE TO RELATED APPLICATIONS

This application is a continuation of U.S. application Ser. No. 14/233,861, filed Jan. 20, 2014; which is the U.S. national stage application of International Patent Application No. PCT/KR2012/005123, filed Jun. 28, 2012; which claims priority to Korean Application No. 10-2011-0071134, filed Jul. 18, 2011, the disclosures of each of which are incorporated herein by reference in their entirety.

TECHNICAL FIELD

The embodiment relates to a display device.

BACKGROUND ART

Some display devices require a backlight unit to generate light in order to display an image. The backlight unit supplies the light to a display panel including liquid crystal. The backlight unit includes a light emitting device and units to effectively transfer light output from the light emitting device toward the liquid crystal.

A light emitting diode (LED) can be used as a light source for the display device. In addition, a light guide plate and optical sheets may be laminated in the display device to effectively transfer the light emitted from the light source to the display panel.

An optical member that converts the wavelength of the light generated from the light source such that white light can be incident into the light guide plate or the display panel can be employed in the display device. In particular, quantum dots may be used to convert the wavelength of the light.

The quantum dot has a particle size of 10 nm or less and the electric and optical characteristics of the quantum dot may vary depending on the particle size thereof. For instance, if the quantum dot has the particle size in the range of about 55 Å to about 65 Å, light having a red color can be emitted. In addition, if the quantum dot has the particle size in the range of about 40 Å to about 50 Å, light having a green color can be emitted and if the quantum dot has the particle size in the range of about 20 Å to about 35 Å, light having a blue color can be emitted. The quantum dot emitting light having a yellow color may have the intermediate particle size between the particle sizes of the quantum dots emitting the red and green colors. The color of the spectrum according to the wavelength of the light tends to be shifted from the red color to the blue color, so it is estimated that the size of the quantum dot may be sequentially changed from 65 Å to 20 Å and this numerical values may be slightly changed.

In order to form the optical member including the quantum dots, the quantum dots emitting RGB colors, which are the three primary colors of the light, or RYGB colors are spin-coated or printed on a transparent substrate, such as a glass substrate. If the quantum dot emitting the yellow color is added, the white light approximate to natural light can be obtained. A matrix (medium) which disperses and carries the quantum dots may emit the light having the visible ray band and the ultraviolet ray band (including far UV band) and may employ an inorganic substance or a polymer representing superior transmittance for the light having the visible ray band. For instance, the organic substance or the polymer may include inorganic silica, polymethylmethacrylate (PMMA), polydimethylsiloxane (PDMS), poly lactic acid (PLA), silicon polymer or YAG.

A display device employing such a quantum dot is disclosed in Korean Unexamined Patent Publication No. 10-2011-0012246.

DISCLOSURE

Technical Problem

The embodiment provides a display device representing improved reliability and durability.

Technical Solution

According to the embodiment, there is provided a display device including: a light source; a wavelength conversion member converting a wavelength of light output from the light source; a display panel to which the light is incident; a heat transfer part adjacent to the light source and the wavelength conversion member; and a heat dissipation part connected to the heat transfer part.

Advantageous Effects

The display device according to the embodiment may efficiently dissipate heat generated from the light source using the heat transfer part and the heat dissipation part. In particular, the heat transfer part is disposed between the light source and the wavelength conversion member, and may absorb heat dissipated from the light source to the wavelength conversion member.

That is, the heat transfer part may transfer the heat, which is dissipated from the light source to the wavelength conversion member, to the heat dissipation part. Further, the display device according to the embodiment may dissipate heat generated from the wavelength conversion member by light output from the light source using the heat transfer part and the heat dissipation part.

Accordingly, the display device according to the embodiment can prevent the wavelength conversion member from being degraded or denatured due to heat. Particularly, the display device according to the embodiment may prevent a host and/or wavelength conversion particles included in the wavelength conversion member from being denatured due to heat. Therefore, the liquid crystal display according to the embodiment can represent improved reliability and durability.

In addition, the display device according to the embodiment can efficiently reduce the temperature of the wavelength conversion member. Therefore, the display device according to the embodiment can reduce the performance degradation of the wavelength conversion particles caused by the temperature increase and can represent an improved color reproduction.

DETAILED DESCRIPTION

Figure 1:
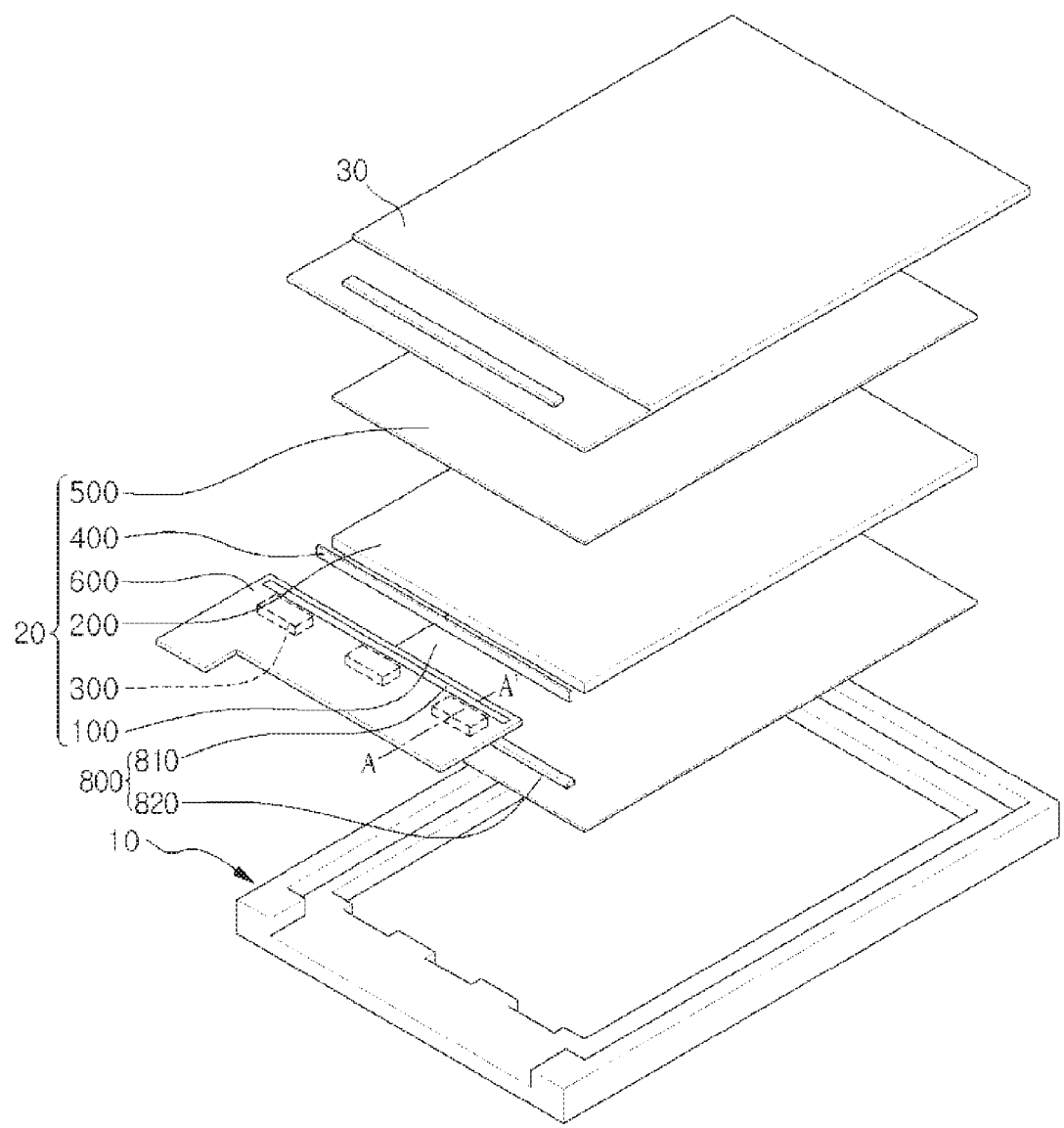
FIG. 1 is an exploded perspective view showing a liquid crystal display according to a first embodiment.

In the description of the embodiments, it will be understood that, when a substrate, a frame, a sheet, a layer, or a pattern is referred to as being "on" or "under" another substrate, another frame, another sheet, another layer, or another pattern, it can be "directly" or "indirectly" on the other substrate, the other frame, the other sheet, the other layer, or the other pattern, or one or more intervening layers may also be present. Such a position of each component has been described with reference to the drawings. The thickness and size of each component shown in the drawings may be exaggerated, omitted or schematically drawn for the purpose of convenience or clarity. In addition, the size of elements does not utterly reflect an actual size.

Figure 2:
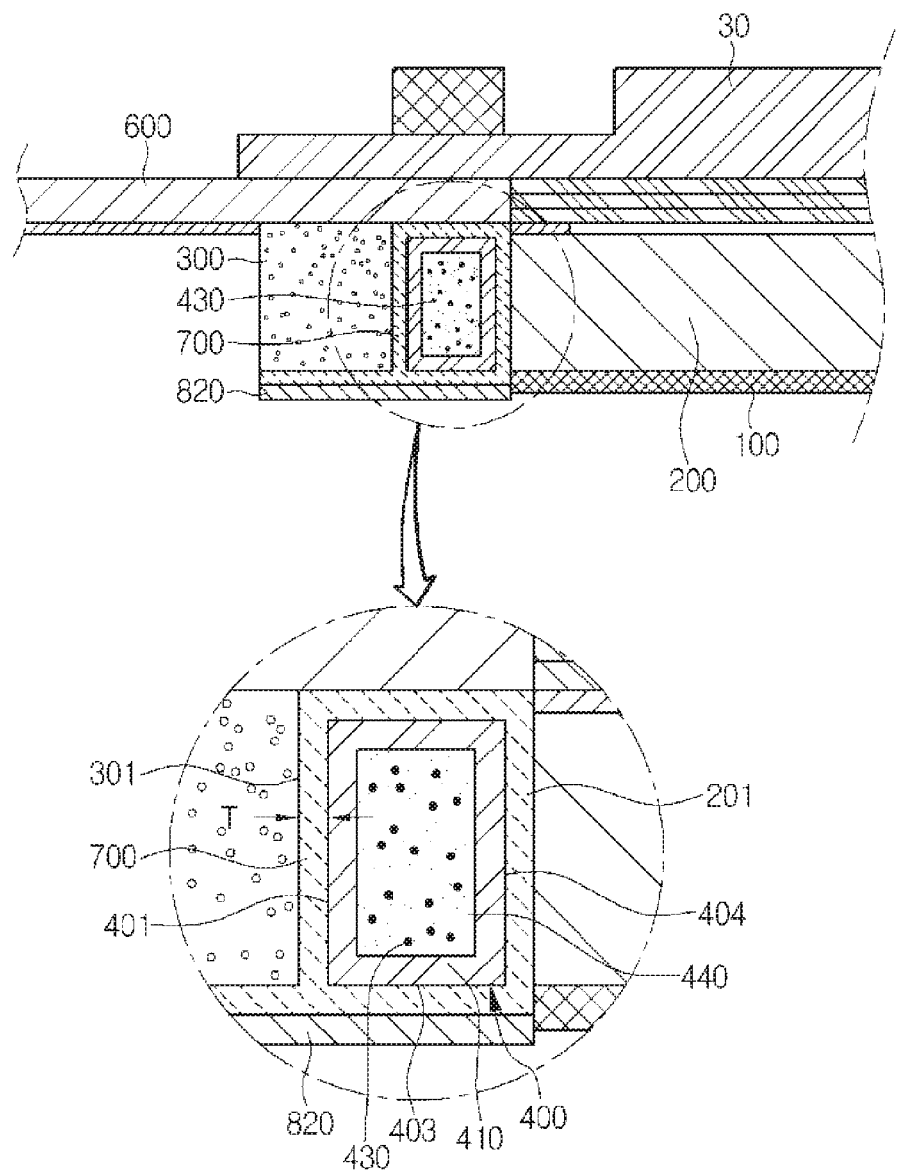
FIG. 2 is a sectional view taken along line A-A' of FIG. 1.
Figure 3:
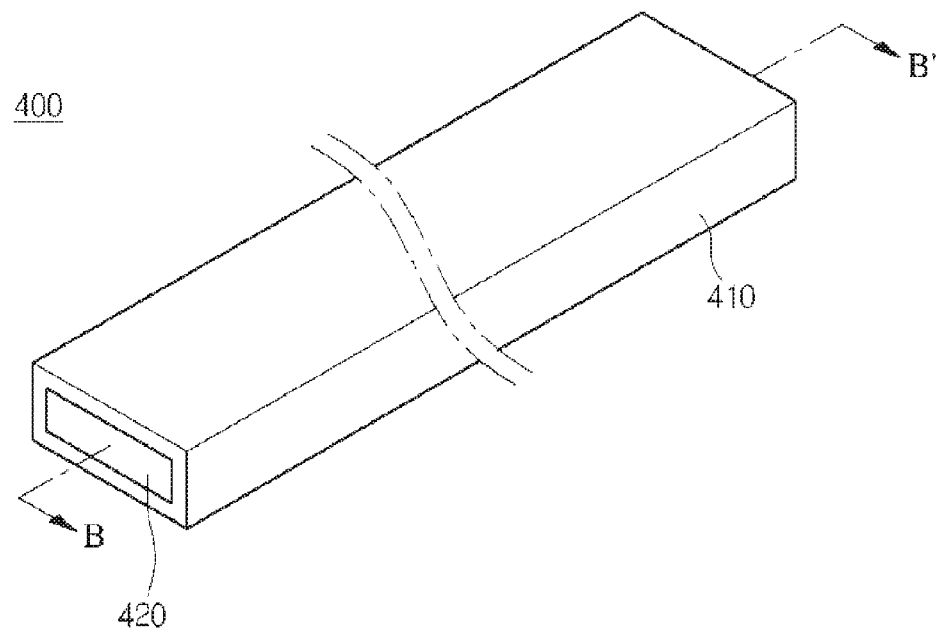
FIG. 3 is a perspective view showing a wavelength conversion member according to the embodiment.
Figure 4:
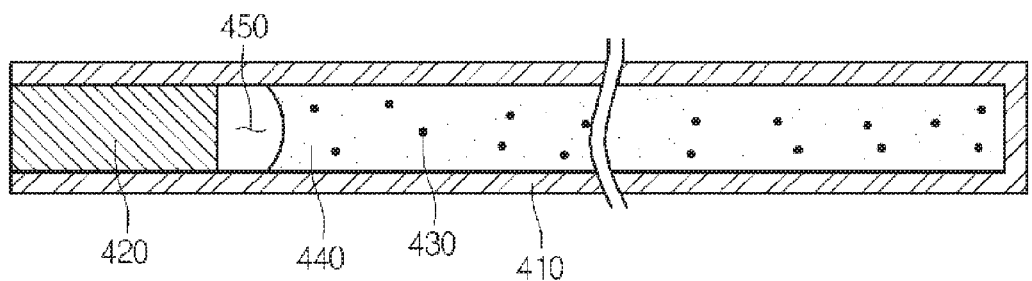
FIG. 4 is a sectional view taken along line B-B' of FIG. 3.
Figure 5:
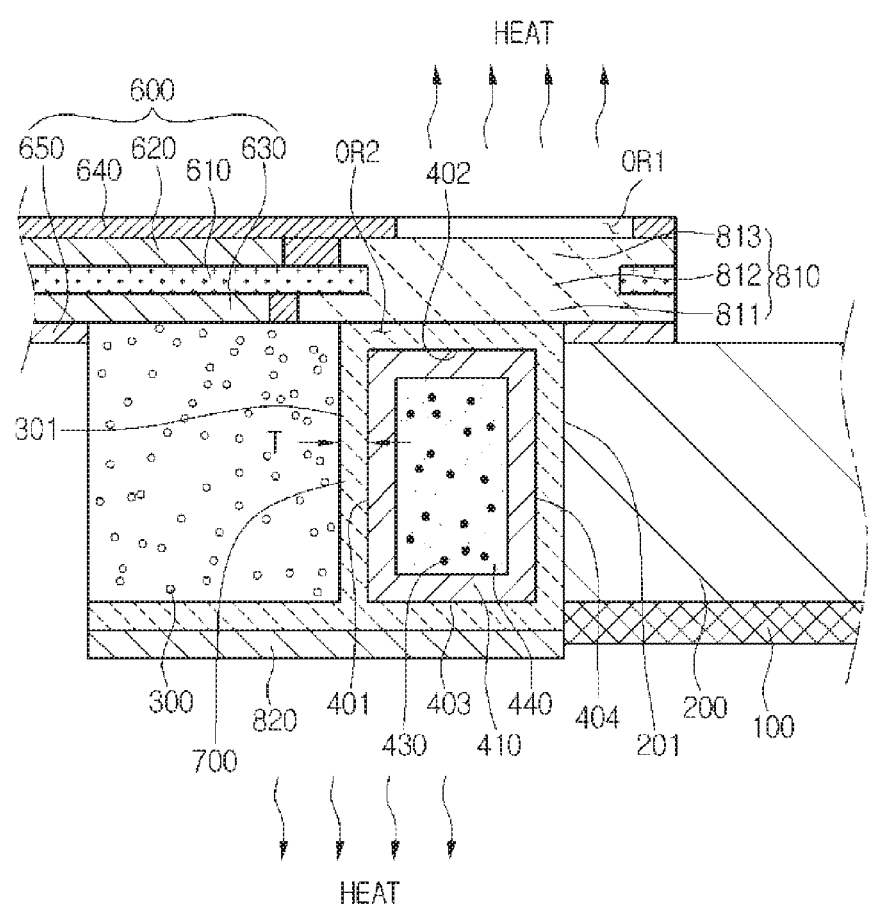
FIG. 5 is a sectional view showing a light emitting diode, a flexible printed circuit board, a wavelength conversion member, and a light guide plate.
Figure 6:
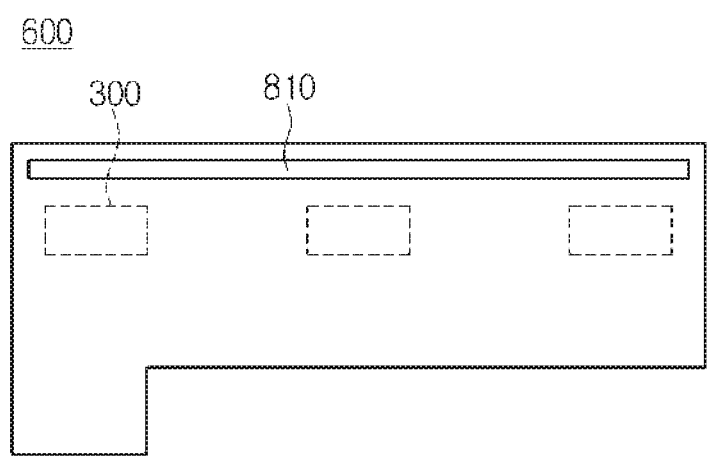
FIG. 6 is a plan view showing a flexible printed circuit board.

FIG. 1 is an exploded perspective view showing a liquid crystal display according to a first embodiment, FIG. 2 is a sectional view taken along line A-A' of FIG. 1, FIG. 3 is a perspective view showing a wavelength conversion member according to the embodiment, FIG. 4 is a sectional view taken along line B-B' of FIG. 3, FIG. 5 is a sectional view showing a light emitting diode, a flexible printed circuit board, a wavelength conversion member, and a light guide plate, and FIG. 6 is a plan view showing a flexible printed circuit board.

Referring to FIGS. 1 to 6, a liquid crystal display according to the embodiment includes a mold frame 10, a backlight assembly 20, and a liquid crystal panel 30.

The mold frame 10 receives the backlight assembly 20 and the liquid crystal panel 30 therein. The mold frame 10 has a rectangular frame shape, and a material used for the mold frame 10 may include plastic or reinforced plastic.

In addition, a chassis may be disposed below the mold frame 10 to surround the mold frame 10 and support the backlight assembly 20. The chassis may also be disposed at a lateral side of the mold frame 10.

The backlight assembly 20 is disposed in the mold frame 10 to supply the light toward the liquid crystal panel 30. The backlight assembly 20 includes a reflective sheet 100, a light guide plate 200, a light source such as a light emitting diode 300, a wavelength conversion member 400, a heat transfer part 700, a heat dissipation part 800, a plurality of optical sheets 500, and a flexible printed circuit board (FPCB) 600.

The reflective sheet 100 reflects the light upward as the light is emitted from the light emitting diodes 300.

The light guide plate 200 is disposed on the reflective sheet 100 to reflect the light upward by totally reflecting, refracting and scattering the light incident thereto from the light emitting diodes 300.

The light guide plate 200 includes an incident surface directed toward the light emitting diodes 300. From among lateral sides of the light guide plate 200, a lateral side directed toward the light emitting diodes 300 may serve as the incident surface.

The light emitting diode 300 is disposed at the lateral side of the light guide plate 200. In detail, the light emitting diode 300 is disposed at the incident surface.

The light emitting diode 300 serves as a light source for generating the light. In detail, the light emitting diode 300 emits the light toward the wavelength conversion member 400.

The light emitting diode 300 generates a first light. For example, the first light may include a blue light. In other words, the light emitting diode 300 may include a blue light emitting diode generating the blue light. The first light may include the blue light having the wavelength band of about 430 nm to about 470 nm. In addition, the light emitting diode 300 may generate a UV light.

The light emitting diode 300 is mounted on the FPCB 600. The light emitting diode 300 is disposed under the FPCB 600. The light emitting diode 300 is driven by receiving a driving signal through the FPCB 600.

The wavelength conversion member 400 is interposed between the light emitting diode 300 and the light guide plate 200. In detail, the wavelength conversion member 400 is bonded to the lateral side of the light guide plate 200. In more detail, the wavelength conversion member 400 is attached to the incident surface of the light guide plate 200. In addition, the wavelength conversion member 400 can be bonded to the light emitting diode 300.

The wavelength conversion member 400 receives the light from the light emitting diode 300 to convert the wavelength of the light. For instance, the wavelength conversion member 400 can convert the first light emitted from the light emitting diode 300 into second and third lights.

In this case, the second light may include a red light, and the third light may include a green light. In other words, the wavelength conversion member 400 converts a part of the light into a red light having the wavelength in the range of about 630 nm to about 660 nm, and converts a part of the first light into the green light having the wavelength in the range of about 520 nm to about 560 nm.

Thus, the first light passing through the light conversion member 400 is combined with the second and third lights converted by the light conversion member 400, so that the white light is emitted. That is, the white light is incident into the light guide plate 200 through the combination of the first to third lights.

As shown in FIGS. 2 to 4, the light conversion member 400 includes a tube 410, a sealing member 420, a plurality of wavelength conversion particles 430, and a matrix 440.

The tube 410 receives the sealing member 420, the wavelength conversion particles 430 and the matrix 440 therein. That is, the tube 410 may serve as a receptacle to receive the sealing member 420, the wavelength conversion particles 430 and the host 440. In addition, the tube 410 extends with a long length in one direction.

The tube 410 may have a rectangular shape. In detail, a section of the tube 410, which is vertical to the length direction of the tube 410, may have the rectangular shape. The tube 410 may have a width of about 0.6 mm and a height of about 0.2 mm. That is, the tube 410 may include a capillary tube.

The tube 410 is transparent. The tube 410 may include glass. In detail, the tube 410 may include a glass capillary tube.

The sealing member 420 is disposed in the tube 410. The sealing member 420 is arranged at an end of the tube 410 to seal the tube 410. The sealing member 420 may include epoxy resin.

The wavelength conversion particles 430 are provided in the tube 410. In detail, the wavelength conversion particles 430 are uniformly distributed in the matrix 440 installed in the tube 410.

The wavelength conversion particles 430 convert the wavelength of the light emitted from the light emitting diode 300. In detail, the light is incident into the wavelength conversion particles 430 from the light emitting diode 300 and the wavelength conversion particles 430 convert the wavelength of the incident light. For instance, the wavelength conversion particles 430 can convert the blue light emitted from the light emitting diode 300 into the green light and the red light. That is, a part of the wavelength conversion particles 430 converts the blue light into the green light having the wavelength in the range of about 520 nm to about 560 nm and a part of the wavelength conversion particles 430 converts the blue light into the red light having the wavelength in the range of about 630 nm to about 660 nm.

In addition, the wavelength conversion particles 430 can convert the UV light emitted from the light emitting diode 300 into the blue light, the green light and the red light. That is, a part of the wavelength conversion particles 430 converts the UV light into the blue light having the wavelength in the range of about 430 nm to about 470 nm, and a part of the wavelength conversion particles 430 converts the UV light into the green light having the wavelength in the range of about 520 nm to about 560 nm. Further, a part of the wavelength conversion particles 430 converts the UV light into the red light having the wavelength in the range of about 630 nm to about 660 nm.

In other words, if the light emitting diode 300 is a blue light emitting diode that emits the blue light, the wavelength conversion particles 430 capable of converting the blue light into the green light and the red light may be employed. In addition, if the light emitting diode 300 is a UV light emitting diode that emits the UV light, the wavelength conversion particles 430 capable of converting the UV light into the blue light, the green light and the red light may be employed.

The wavelength conversion particles 430 may include a plurality of quantum dots. The quantum dots may include core nano-crystals and shell nano-crystals surrounding the core nano-crystals. In addition, the quantum dots may include organic ligands bonded to the shell nano-crystals. In addition, the quantum dots may include an organic coating layer surrounding the shell nano-crystals.

The shell nano-crystals may be prepared as at least two layers. The shell nano-crystals are formed on the surface of the core nano-crystals. The quantum dots can lengthen the wavelength of the light incident into the core nano-crystals by using the shell nano-crystals forming a shell layer, thereby improving the light efficiency.

The quantum dots may include at least one of a group-II compound semiconductor, a group-III semiconductor, a group-V compound semiconductor, and a group-VI compound semiconductor. In more detail, the core nano-crystals may include CdSe, InGaP, CdTe, CdS, ZnSe, ZnTe, ZnS, HgTe or HgS. In addition, the shell nano-crystals may include CuZnS, CdSe, CdTe, CdS, ZnSe, ZnTe, ZnS, HgTe or HgS. The quantum dot may have a diameter of about 1 nm to about 10 nm.

The wavelength of the light emitted from the quantum dots can be adjusted according to the size of the quantum dot. The organic ligand may include pyridine, mercapto alcohol, thiol, phosphine, and phosphine oxide. The organic ligand may stabilize the unstable quantum dots after the synthesis process. Dangling bonds may be formed at the valence band after the synthesis process and the quantum dots may be unstable due to the dangling bonds. However, since one end of the organic ligand is the non-bonding state, one end of the organic ligand is bonded with the dangling bonds, thereby stabilizing the quantum dots.

In particular, if the size of the quantum dot is smaller than the Bohr radius of an exciton, which consists of an electron and a hole excited by light and electricity, the quantum confinement effect may occur, so that the quantum dot may have the discrete energy level. Thus, the size of the energy gap is changed. In addition, the charges are confined within the quantum dot, so that the light emitting efficiency can be improved.

Different from general fluorescent pigments, the fluorescent wavelength of the quantum dot may vary depending on the size of the particles. In detail, the light has the shorter wavelength as the size of the particle becomes small, so the fluorescent light having the wavelength band of visible ray can be generated by adjusting the size of the particles. In addition, the quantum dot represents the extinction coefficient, which is 100 to 1000 times higher than that of the general fluorescent pigment, and has the superior quantum yield as compared with the general fluorescent pigment, so that that strong fluorescent light can be generated.

The quantum dots can be synthesized through the chemical wet scheme. The chemical wet scheme is to grow the particles by immersing the precursor material in the organic solvent. According to the chemical wet scheme, the quantum dots can be synthesized.

The matrix 440 surrounds the wavelength conversion particles 430. In detail, the wavelength conversion particles 430 are uniformly distributed in the matrix 440. The matrix includes polymer. The matrix 440 is transparent. That is, the matrix 440 includes transparent polymer.

The matrix 440 is disposed in the tube 410. In detail, the matrix 440 is fully filled in the tube 410. The matrix 440 may adhere to an inner surface of the tube 410.

The wavelength conversion member 400 may be formed through the following method.

First, the wavelength conversion particles 430 may be uniformly distributed into resin composition. The resin composition is transparent. The resin composition may have a photo-curable property.

Then, internal pressure of the tube 410 is reduced, an inlet of the tube 410 is immersed in the resin composition in which the wavelength conversion particles 430 are distributed, and ambient pressure is increased. Thus, the resin composition having the wavelength conversion particles 430 is introduced into the tube 410.

After that, a part of the resin composition introduced into the tube 410 is removed and the inlet of the tube 410 is empty.

The resin composition introduced into the tube 410 is cured by UV light, thereby forming the matrix 440.

Then, epoxy resin composition is introduced into the inlet of the tube 410. The epoxy resin composition is cured so that the sealing member 420 is formed. The process for forming the sealing member 420 is performed under the nitrogen atmosphere, so the air layer including nitrogen is formed between the sealing member 420 and the matrix 440.

The heat transfer part 700 is interposed between the light emitting diode 300 and the wavelength conversion member 400. In more detail, the heat transfer part 700 may be provided on the exit surface of the light emitting diode 300. Further, the heat transfer part 700 may be provided on the incident surface 401 of the wavelength conversion member 400. In more detail, the heat transfer part 700 may closely adhere to the exit surface 301 of the light emitting diode 300.

Further, the heat transfer part 700 may closely adhere to the incident surface 401 of the wavelength conversion member 400.

The heat transfer part 700 may be interposed between the light guide plate 200 and the wavelength conversion member 400. The heat transfer part 700 may closely adhere to the light guide plate 200 and the wavelength conversion member 400. Further, the heat transfer part 700 may cover a top surface 402 and a bottom surface 403 of the wavelength conversion member 400. That is, the heat transfer part 700 may surround the wavelength conversion member 400. The heat transfer part 700 is connected to the heat dissipation part 800. The heat transfer part 700 may be directly or indirectly connected to the heat dissipation part 800. The thickness T of the heat transfer part 700 may be in the range of about 20 μm to about 30 μm.

The heat transfer part 700 may represent high thermal conductivity. The heat transfer part 700 may represent thermal conductivity in the range of about 1.5×10-4 cal/sec·cm·° C. to about 20×10-4 cal/sec·cm·° C. The heat transfer part 700 may have thermal conductivity higher than that of the tube 410.

The heat transfer part 700 is transparent. A refractive index of the heat transfer part 700 may be an intermediate value between refractive indexes of the tube 410 and a filling material of the light emitting diode 300. In more detail, the refractive index of the heat transfer part may be in the range of about 1.5 to about 1.6.

The heat transfer part 700 may include polymer representing high thermal conductivity and transmissivity. In more detail, the material constituting the heat transfer part 700 may include silicon resin, epoxy resin, phenolic resin, urethane resin, or urea resin.

The heat dissipation part 800 is connected to the heat transfer part 700. The heat dissipation part 800 may be directly or indirectly connected to the heat transfer part 700. The heat dissipation part 800 may dissipate heat transferred from the heat transfer part 700.

Referring to FIGS. 1, 5, and 6, the heat dissipating part 800 includes a first heat dissipating part 810 and a second heat dissipating part 820.

The first heat dissipating part 810 is provided at the FPCB 600. In more detail, the first heat dissipating part 810 is provided inside the FPCB 600. The first heat dissipating part 810 may be included in the FPCB 600. In other words, the first heat dissipating part 810 may be a part of the FPCB 600.

The first heat dissipating part 810 may be provided on the wavelength conversion member 400. In addition, the first heat dissipating part 810 may extend in the extension direction of the wavelength conversion member 400. In addition, the first heat dissipating part 810 is connected to the heat transfer part 700. In more detail, the first heat dissipating part 810 may directly make contact with the heat transfer part 700.

The first heat dissipating part 810 may include a material having high thermal conductivity. For example, the first heat dissipating part 810 may include metal such as copper (Cu).

As shown in FIG. 5, the first heat dissipating part 810 includes a contact part 811, a connection via 812, and a heat radiation pad 813.

The contact part 811 directly or indirectly makes contact with the heat transfer part 700. The connection via 812 is connected to the contact part 811 and the heat radiation pad 813. In other words, the connection via 812 connects the contact part 811 with the heat radiation pad 813.

The heat radiation pad 813 is connected to the connection via 812. The heat radiation pad 813 may be exposed to the outside. The heat radiation pad 813 dissipates heat transferred from the heat transfer part 700 to the outside, especially, into the atmosphere.

The second heat dissipating part 820 is provided under the wavelength conversion member 400. In more detail, the second heat dissipating part 820 may be provided under the light emitting diodes 300. The second heat dissipating part 820 is connected to the heat transfer part 700. In more detail, the second heat dissipating part 820 may directly make contact with the heat transfer part 700.

The second heat dissipating part 820 may have a shape extending in an extension direction of the wavelength conversion member 400. For example, the second heat dissipating part 820 may have a bar shape or a strip shape extending in the extension direction of the wavelength conversion member 400.

The second heat dissipating part 820 may include a material having high thermal conductivity. For example, the second heat dissipating part 820 may include metal such as aluminum (Al) or copper (Cu).

The second heat dissipating part 820 may dissipate heat transferred from the heat transfer part 700 to the outside, especially, into the atmosphere.

The optical sheets 500 are disposed on the light guide plate 200 to improve the characteristic of the light passing through the optical sheets 500.

The FPCB 600 is electrically connected to the light emitting diodes 300. The FPCB 600 may mount the light emitting diodes 300 thereon. The FPCB 600 is installed in the mold frame 10 and arranged on the light guide plate 200.

Referring to FIG. 5, the FPCB 600 may include the first heat dissipating part 810. The FPCB 600 may include a support layer 610, a first interconnection layer 620, a second interconnection layer 630, a first protective layer 640, and a second protective layer 650.

The support layer 610 supports the first interconnection layer 620, the second interconnection layer 630, the first protective layer 640, and the second protective layer 650. The support layer 610 includes an insulating layer. The support layer 610 may be flexible. The material constituting the support layer 610 may include polymer such as polyimide-based resin.

The first interconnection layer 620 is provided on the support layer 610. The first interconnection layer 620 may directly make contact with the top surface of the support layer 610. The first interconnection layer 620 may include Cu.

The second interconnection layer 630 is provided under the support layer 610. The second interconnection layer 630 may directly make contact with the bottom surface of the support layer 610. The second interconnection layer 630 may include Cu. The first and second interconnection layers 620 and 630 may be connected to each other through a via formed through the support layer 610.

The second interconnection layer 630 is connected to the light emitting diodes 300. In more detail, the light emitting diodes 300 may be electrically connected to the second interconnection layer 630 through a solder or a bump.

The first protective layer 640 is provided on the first interconnection layer 620. The first protective layer 640 covers the first interconnection layer 620. The first protective layer 640 protects the first interconnection layer 620. The first protective layer 640 may include an insulator such as polymer.

The second protective layer 650 is provided under the second interconnection layer 630. The second protective layer 650 covers the second interconnection layer 630. The second protective layer 650 protects the second interconnection layer 630. The second protective layer 650 may include an insulator such as polymer.

The first heat dissipating part 810 may be included in the FPCB 600. In other words, the heat radiation pad 813 may be formed in the same layer with the first interconnection layer 620. In addition, the connection via 812 may be formed through the support layer 610. The connection via 812 may be formed in the same layer with the second interconnection layer 630. In addition, the first protective layer 640 may be formed therein with a first open region OR1 to expose the top surface of the heat radiation pad 813 to the outside. In addition, the second protective layer 650 may be formed therein with a second open region OR2 to expose the contact part 811 to the wavelength conversion member 400.

The backlight unit is constructed by the mold frame 10 and the backlight assembly 20. In other words, the backlight unit includes the mold frame 10 and the backlight assembly 20.

The liquid crystal panel 30 is provided inside the mold frame 10, and arranged on the optical sheets 500.

The liquid crystal panel 30 displays images by adjusting intensity of the light passing through the liquid crystal panel 30. That is, the liquid crystal panel 30 is a display panel to display the images. The liquid crystal panel 30 includes a TFT substrate, a color filter substrate, a liquid crystal layer interposed between the above two substrates and polarizing filters.

As described above, the liquid crystal display according to the embodiment may efficiently dissipate heat generated from the light emitting diode 300 using the heat transfer part 700 and the heat dissipation part 800. Particularly, the heat transfer part 700 may be interposed between the light emitting diode 300 and the wavelength conversion member 400 and may absorb the heat dissipated from the light emitting diode 300 toward the wavelength conversion member 400.

That is, the heat transfer part 700 may transfer the heat, which is dissipated from the light emitting diode 300 to the wavelength conversion member 400, to the heat dissipation part 800. Further, the display device according to the embodiment may dissipate heat generated from the wavelength conversion member 400 by light output from the light source using the heat transfer part 700 and the heat dissipation part 800.

Accordingly, the display device according to the embodiment can prevent the wavelength conversion member 400 from being degraded or denatured due to heat. Particularly, the display device according to the embodiment may prevent a host 440 and/or a wavelength conversion particles 430 from being denatured caused by heat. Therefore, the liquid crystal display according to the embodiment can represent improved reliability and durability.

In addition, the display device according to the embodiment can efficiently reduce the temperature of the wavelength conversion member 400. Therefore, the display device according to the embodiment can reduce the performance degradation of the wavelength conversion particles 430 caused by the temperature increase and can represent an improved color reproduction.

Figure 7:
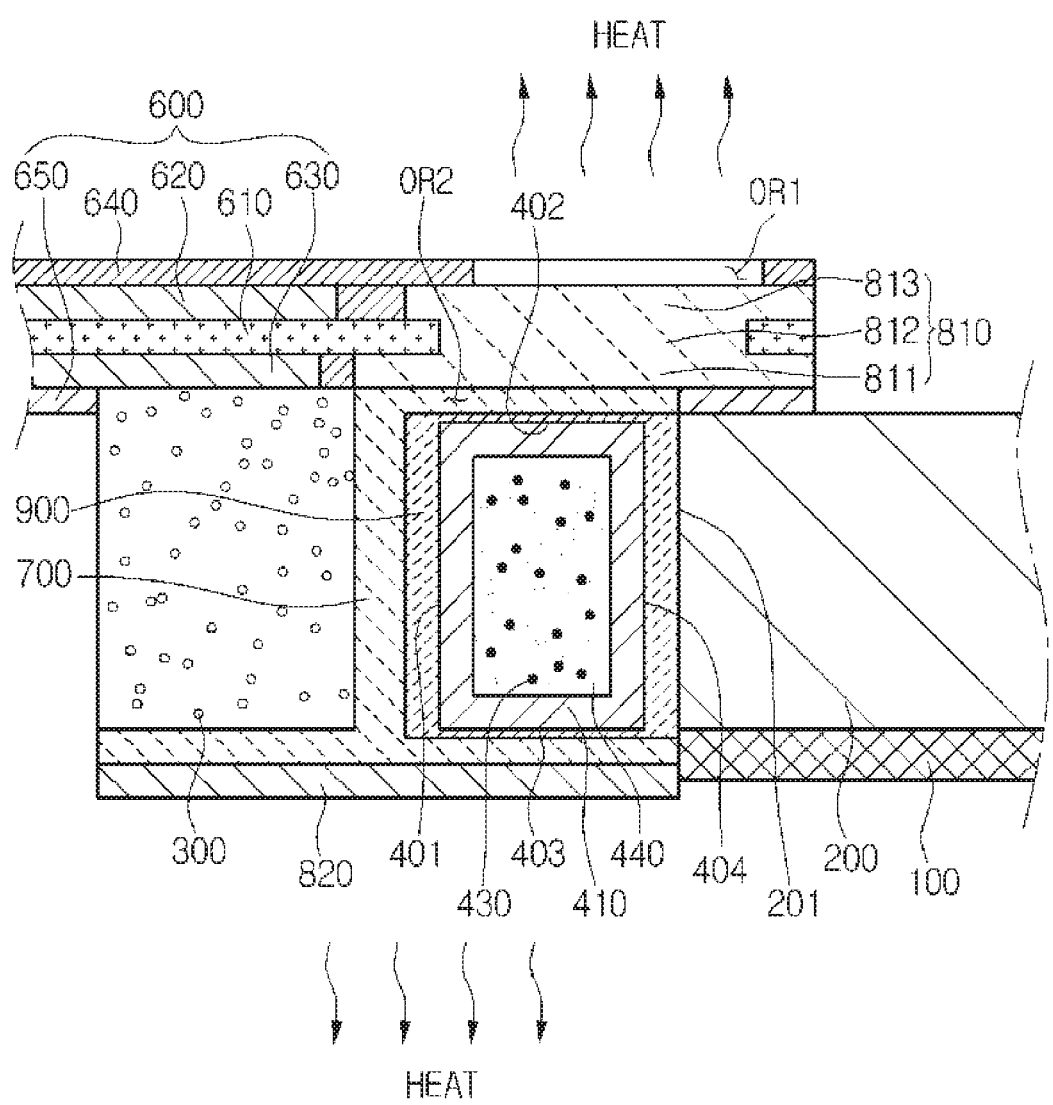
FIG. 7 is a sectional view showing a light emitting diode, a flexible printed circuit board, a wavelength conversion member, and a light guide plate according to another embodiment.

FIG. 7 is a sectional view showing a light emitting diode, a flexible printed circuit board, a wavelength conversion member, and a light guide plate according to another embodiment. Hereinafter, the heat transfer part and the heat blocking part according to the present embodiment will be described by making reference to the above description of the liquid crystal display. The description of the previous embodiment may be incorporated herein by reference except for the modified parts.

Referring to FIG. 7, the liquid crystal display includes a heat blocking part 900. The heat blocking part 900 is interposed between the heat transfer part 700 and the wavelength conversion member 400. In more detail, the heat blocking part 900 may closely adhere to the heat transfer part 700 and the wavelength conversion member 400.

Further, the heat blocking part 900 may closely adhere to the incident surface 401 of the wavelength conversion member 400. The heat blocking part 900 may closely adhere to a top surface 420 of the wavelength conversion member 400 and/or a bottom surface of the wavelength conversion member 400. Moreover, the heat blocking part 900 may closely adhere to the light guide plate 200. That is, the blocking part 900 may closely adhere to both of the exit surface of the wavelength conversion member 400 and the incident surface of the light guide plate 200.

The heat blocking part 900 may represent thermal conductivity lower than that of the heat transfer part 700. The heat blocking part 900 may represent thermal conductivity in the range of about $0.1 \times 10-4$ cal/sec·cm·° C. to about $1.0 \times 10-4$ cal/sec·cm·° C., and the heat transfer part 700 may represent thermal conductivity in the range of about $1.5 \times 10-4$ cal/sec·cm·° C. to about $20 \times 10-4$ cal/sec·cm·° C.

The heat blocking part 900 may be transparent. A refractive index of the heat blocking part 900 may be an intermediate value between refractive indexes of the heat transfer part 700 and the tube 410 of the wavelength conversion member 400. Resin having a plurality of pores may be used as the heat blocking part 900. Vinyl chloride resin or the like may be used as the heat blocking part 900.

The heat blocking part 900 shields heat generated from the light emitting diode 300. The heat blocking part 900 may prevent the heat generated from the light emitting diode 300 from being transferred to the wavelength conversion member 400.

Accordingly, the liquid crystal display according to the present embodiment may reduce heat to be transferred to the wavelength conversion 400 and may efficiently dissipate the heat through the heat transfer part 700 and the heat dissipation part 800.

Therefore, the liquid crystal display according the present embodiment may represent improved reliability, durability, brightness, and color reproduction.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight assembly comprising:
a reflective sheet;
a light guide plate on the reflective sheet, comprising an incident surface;
a plurality of optical sheets on the light guide plate;
a plurality of LEDs arranged along the incident surface of the light guide plate;
a light conversion member between the plurality of LEDs and the light guide plate; and
a heat transfer part adjacent to the plurality of LEDs and the light conversion member;
wherein the light conversion member comprises:
a tube;
a host in the tube; and
a plurality of quantum dots in the host,
wherein the tube comprises:
an incident surface opposite to the plurality of LEDs;
an exit surface opposite to the incident surface;
a top surface extending from the incident surface to the exit surface,
a bottom surface extending from the incident surface to the exit surface,
wherein a portion of the heat transfer part is disposed on the incident surface of the tube,
wherein the heat transfer part includes a top portion which is disposed on the top surface of the tube,
wherein the heat transfer part includes a bottom portion which is disposed on the bottom surface of the tube,
wherein a portion of the heat transfer part is disposed under the plurality of LEDs, and
wherein the tube extends along the incident surface of the light guide plate.

2. The backlight assembly of claim 1, wherein the heat transfer part is in direct physical contact with the wavelength conversion member.

3. The backlight assembly of claim 1, wherein the top portion of the heat transfer part has a width that is larger than that of the top surface of the wavelength conversion member.

4. The backlight assembly of claim 3, wherein the bottom portion of the heat transfer part has a width that is larger than that of the bottom surface of the wavelength conversion member.

5. The backlight assembly of claim 1, wherein the bottom portion of the heat transfer part has a width that is larger than that of the top portion of the heat transfer part.

6. The backlight assembly of claim 1, wherein the tube is transparent.

7. The backlight assembly of claim 1, wherein the tube includes glass.

8. The backlight assembly of claim 1, wherein the heat transfer part includes polymer.

9. The backlight assembly of claim 8, wherein the heat transfer part includes silicon resin, epoxy resin, phenolic resin, urethane resin, or urea resin.

10. The backlight assembly of claim 1, wherein a thermal conductivity of the heat transfer part higher than a thermal conductivity of the tube.

11. A display device comprising:
a frame;
a backlight assembly on the mold frame;
a liquid crystal panel on the backlight assembly;
wherein the backlight assembly comprising:
a reflective sheet;
a light guide plate on the reflective sheet, comprising an incident surface;
a plurality of optical sheets on the light guide plate;
a plurality of LEDs arranged along the incident surface of the light guide plate;
a light conversion member between the plurality of LEDs and the light guide plate; and
a heat transfer part adjacent to the plurality of LEDs and the light conversion member;
wherein the light conversion member comprises:
a tube;
a host in the tube; and
a plurality of quantum dots in the host,
wherein the tube comprises:
an incident surface opposite to the plurality of LEDs;
an exit surface opposite to the incident surface;
a top surface extending from the incident surface to the exit surface,
a bottom surface extending from the incident surface to the exit surface,
wherein a portion of the heat transfer part is disposed on the incident surface of the tube,
wherein the heat transfer part includes a top portion which is disposed on the top surface of the tube,
wherein the heat transfer part includes a bottom portion which is disposed on the bottom surface of the tube,
wherein a portion of the heat transfer part is disposed under the plurality of LEDs, and
wherein the tube extends along the incident surface of the light guide plate.

12. The display device of claim 11, wherein the heat transfer part is in direct physical contact with the wavelength conversion member.

13. The display device of claim 11, wherein the top portion of the heat transfer part has a width that is larger than that of the top surface of the wavelength conversion member.

14. The display device of claim 13, wherein the bottom portion of the heat transfer part has a width that is larger than that of the bottom surface of the wavelength conversion member.

15. The display device of claim 11, wherein the bottom portion of the heat transfer part has a width that is larger than that of the top portion of the heat transfer part.

16. The display device off claim 11, wherein the tube is transparent and the tube includes glass.

17. The display device off claim 11, wherein the frame includes plastic or reinforced plastic.

18. The display device of claim 11, wherein the heat transfer part includes polymer.

19. The display device of claim 18, wherein the heat transfer part includes silicon resin, epoxy resin, phenolic resin, urethane resin, or urea resin.

20. The display device of claim 11, wherein a thermal conductivity of the heat transfer part higher than a thermal conductivity of the tube.

* * * * *